United States Patent
Wu et al.

(10) Patent No.: US 8,432,924 B2
(45) Date of Patent: Apr. 30, 2013

(54) ROUTING OPTIMIZATION METHOD AND MESSAGE TRANSMISSION SYSTEM BASED ON PROXY MOBILE AGENT

(75) Inventors: Qin Wu, Shenzhen (CN); Zhigang Huang, Shenzhen (CN); Liyun Ou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 694 days.

(21) Appl. No.: 12/541,367

(22) Filed: Aug. 14, 2009

(65) Prior Publication Data

US 2010/0008300 A1 Jan. 14, 2010

Related U.S. Application Data

(63) Continuation of application No. PCT/CN2008/070313, filed on Feb. 15, 2008.

(30) Foreign Application Priority Data

Feb. 15, 2007 (CN) .......................... 2007 1 0026969

(51) Int. Cl.
*H04L 12/28* (2006.01)
(52) U.S. Cl.
USPC .......................................... 370/410; 709/238
(58) Field of Classification Search .................. 370/238, 370/392, 401; 713/158
See application file for complete search history.

(56) References Cited

U.S. PATENT DOCUMENTS

| 2004/0095913 | A1 | 5/2004 | Westphal |
| 2004/0202183 | A1* | 10/2004 | Thubert et al. ............ 370/395.31 |
| 2004/0228343 | A1* | 11/2004 | Molteni et al. ................ 370/392 |
| 2005/0099971 | A1 | 5/2005 | Droms et al. |
| 2006/0018291 | A1 | 1/2006 | Patel et al. |
| 2006/0245362 | A1* | 11/2006 | Choyi ........................... 370/238 |
| 2007/0016774 | A1 | 1/2007 | Bakshi |
| 2007/0113075 | A1* | 5/2007 | Jo et al. ......................... 713/158 |

FOREIGN PATENT DOCUMENTS

| CN | 1706152 | 12/2005 |
| CN | 1784059 | 6/2006 |
| EP | 1030491 | 8/2000 |
| WO | WO 2004/010668 | 1/2004 |
| WO | WO-2006011053 | 2/2006 |

OTHER PUBLICATIONS

Johnson et al., "Mobility Support in IPv6", Jun. 2004, IETF, entire document.*

(Continued)

*Primary Examiner* — Huy D Vu
*Assistant Examiner* — Joseph Bednash
(74) *Attorney, Agent, or Firm* — Leydig, Voit & Mayer, Ltd.

(57) ABSTRACT

A routing optimization method includes: establishing a routing optimization proxy binding relationship between a proxy mobile agent (PMA) of a mobile node and a PMA of a correspondent node; controlling, by the PMA of the mobile node, according to the established routing optimization proxy binding relationship, routing of a message to be transmitted. And a message transmission system based on a PMA is also provided, which includes: a proxy binding control unit, configured to establish a routing optimization proxy binding relationship with a PMA of a correspondent node; and a routing control unit, configured to control routing of a message to be transmitted based on the established routing optimization proxy binding relationship. With the present invention, it may raise the communication efficiency for various nodes in the proxy mobile IP architecture and improve the routing performance.

8 Claims, 5 Drawing Sheets

OTHER PUBLICATIONS

Johnson et al. "Mobility Support in IPv6 draft-ietf-mobileip-ipv6-20.txt", IETF Mobile IP Working Group, Jan. 20, 2003.*

Gundavelli et al., "Proxy Mobile IPv6 draft-sgundave-mip6-proxymip6-01", IETF Internet Draft, Jan. 5, 2007.*

Ng et al., Taxonomy of Route Optimization models in the NEMO context draft-thrubert-nemo-ro-taxonomy-04, IETF Internet Draft, Feb. 21, 2005.*

Johnson et al., "Mobility Support in IPv6", IETF Network Working Group, Jun. 2004.*

European Patent Office Communication pursuant to Article 94(3) EPC, European search opinion for Application No. EP08706686.6, mailed Jan. 11, 2011, Huawei Technologies Co., Ltd 4 pgs.

European Patent Office Communication pursuant to Article 94(3) and Rule 71(1) EPC, for European Application No. 08706686.6, mailed Aug. 24, 2011, Huawei Technologies Co., Ltd.

English translation of the Written Opinion of the International Searching Authority for International application No. PCT/CN2008/070313, mailed May 29, 2008, 4 pgs.

European Patent Office Communication enclosing the extended European search report including, pursuant to Rule 62 EPC, the supplementary Euroopean search report (Art. 153(7) EPC) and the European search opinion for application No. 08706686.6, dated Jun. 15, 2010, 7 pgs.

Chowdhury, K, et al., "Network Based Layer 3 Connectivity and Mobility Management for IPv6", Network Working Group, Internet-Draft, Sep. 8, 2006, 17 pgs.

Gundavelli, S, et al. "Proxy Mobile IPv6", IETF Standard-Working-Draft, Internet Engineering Task Force, IETF, CH, No. 1, Jan. 5, 2007, XP015050402, 39 pgs.

Second Chinese Office Action (Partial Translation) related to Chinese Application No. 200710026969.6, dated (mailed) Jan. 31, 2012; Chinese version attached (9 pgs.).

Office Action in corresponding Chinese Patent Application No. 200710026969.6 (Sep. 27, 2012).

* cited by examiner

ROUTING OPTIMIZATION METHOD AND MESSAGE TRANSMISSION SYSTEM BASED ON PROXY MOBILE AGENT

CROSS REFERENCE TO RELATED APPLICATIONS

The application is a continuation of International Patent Application No. PCT/CN2008/070313, filed on Feb. 15, 2008, which claims priority to Chinese Patent Application No. 200710026969.6, filed on Feb. 15, 2007, both of which are incorporated by reference herein in their entireties.

FIELD OF THE INVENTION

The present invention relates to communication field, and more specifically, to a routing optimization method and a message transmission system based on a Proxy Mobile Agent.

BACKGROUND

Proxy Mobile IPv6 (Pmip6) Protocol is a mobility management protocol based on network which liberates mobile nodes (MNs) from the mobility management protocol. In a Pmip6 protocol architecture, since the mobility management protocol is not supported by the mobile nodes and the mobile nodes are not capable of directly participating in signaling interactions, i.e. messages may not be directly transmitted to a correspondent node (CN) during message transmission, a Proxy Mobile Agent (PMA) is therefore provided to substitute for the mobile nodes to accomplish relevant interactions of protocol signaling and to transmit/receive messages. That is, the PMA simulates home links and announces home prefixes which may give the mobile nodes a false feeling of always being on the home links. The PMA is also called the Mobile Access Gateway (MGW).

In the recent Pmip6 protocol architecture, the procedure for receiving and responding a message by a mobile node is described below. Referring to FIG. 1, a schematic of a message interaction between a correspondent node and a mobile node in the PMIP architecture of conventional art is illustrated.

First, the correspondent node sends a message to a home address of the mobile node. A home agent captures the message, queries for a binding list based on the home address to obtain a PMA address of the mobile node, and sends the message to the PMA of the mobile node through a tunnel between the home agent and the PMA of the mobile node. And then, the PMA of the mobile node directly sends the message to the mobile node based on the home address of the mobile node.

Next, upon receipt of the message from the correspondent node, the mobile node directly replies a message to the correspondent node with the home address being a source address. The PMA captures the message and sends the message to the home agent through the tunnel between the home agent and the PMA of the mobile node. The home agent strips off an outer IP message header and sends the inner message to the correspondent node.

It is noted from the above interaction of message, because the mobile management protocol is not supported by the mobile node in PMIP6 and the message can not be directly sent to the correspondent node, the home agent is therefore provided to operate the message interaction between the mobile node and the correspondent node, which reduces the communication efficiency and the routing performance.

SUMMARY

Routing optimization methods and message transmission systems based on a proxy mobile agent (PMA) are provide according to the present invention in order to raise the communication efficiency for various nodes in the proxy mobile IP architecture and to improve the routing performance.

A routing optimization method according to one embodiment of the present invention includes: establishing a routing optimization proxy binding relationship between a PMA of a mobile node and a PMA of a correspondent node; and controlling, by the PMA of the mobile node, according to the established routing optimization proxy binding relationship, routing of a message to be transmitted.

Another routing optimization method according to one embodiment of the present invention includes: establishing a routing optimization proxy binding relationship between a PMA of a mobile node and a correspondent node; and controlling, by the PMA of the mobile node, according to the established routing optimization proxy binding relationship, routing of a message to be transmitted.

A proxy mobile agent according to one embodiment of the present invention includes: a proxy binding control unit, configured to establish a routing optimization proxy binding relationship with a PMA of a correspondent node; and a routing control unit, configured to control routing of a message to be transmitted based on the established routing optimization proxy binding relationship.

A message transmission system based on a proxy mobile agent according to one embodiment of the present invention includes: a transmitting end mobile node, configured to transmit a message; a transmitting end PMA corresponding to the transmitting end mobile node, configured to obtain the message from the transmitting end mobile node, and to transmit the message based on a cached routing optimization proxy binding between a receiving end home address and a receiving end PMA address of the message after an outer message header is added in the message with the receiving end PMA address being a destination address; a receiving end PMA, configured to receive the message from the transmitting end PMA, and to transmit the message after the message header is striped off; and a receiving end node, configured to receive the message from the receiving end PMA.

Another message transmission system based on a proxy mobile agent according to one embodiment of the present invention includes: a transmitting end mobile node, configured to transmit a message; a transmitting end PMA corresponding to the transmitting end mobile node, configured to obtain the message, and to transmit the message based on a cached routing optimization proxy binding between a receiving end home address and a receiving end home address of the message after an outer message header is added in the message with the receiving end home address being a destination address; and a receiving end node, configured to receive the message.

According to the technical solutions in the present invention, the PMA of the mobile node establishes the routing optimization proxy binding between the PMA of the mobile node and the PMA of the correspondent node, or between the PMA of the mobile node and the correspondent node, according to the interaction with the home agent of the correspondent node. And then the routing for the message to be transmitted is controlled based on the established routing optimization proxy binding. The message may be transmitted directly to the correspondent PMA or to the correspondent node without the operation by the home agent because of the established routing optimization proxy binding. As a result, the communication efficiency is raised and the routing performance is improved.

DETAILED DESCRIPTION

In the technical solutions according to the present invention, the performance of routing between a mobile node and a correspondent node is improved and the communication efficiency is raised with the optimization of routing between a PMA of a mobile node and a PMA of a correspondent node or routing between a PMA of a mobile node and a correspondent node. The description below will be made to the preferable embodiments of the present invention in conjunction with the annexed drawings.

Figure 1:
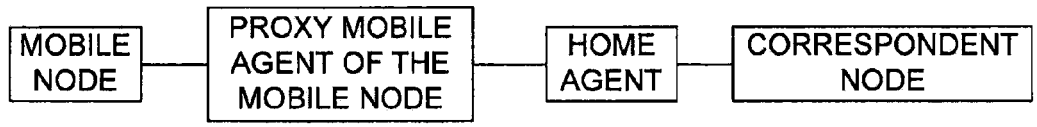
FIG. 1 is a diagram of a message interaction between a correspondent node and a mobile node in a PMIP architecture in the conventional art.
Figure 2:
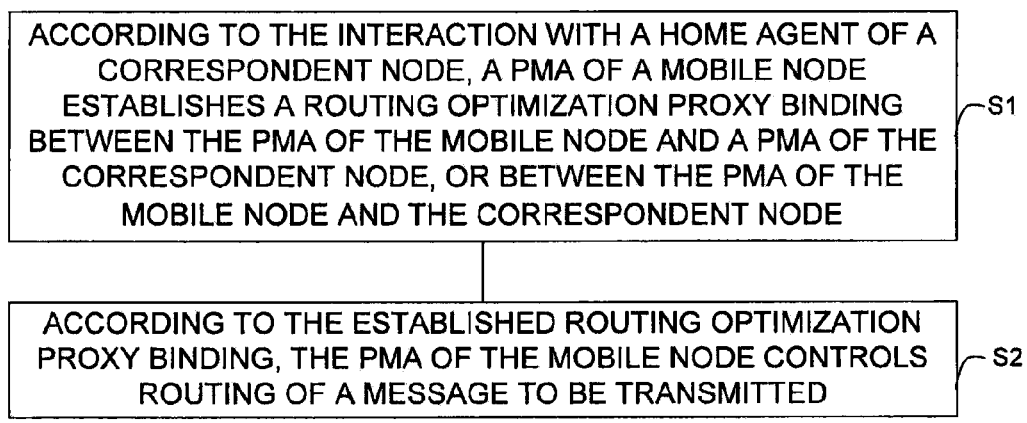
FIG. 2 is a flowchart diagram of a routing optimization method according to a first embodiment of the present invention.

Referring to FIG. 2, a main flowchart diagram of a routing optimization method according to a first embodiment of the present invention is illustrated. The procedure includes following steps.

Step S1: According to the interaction with a home agent of a correspondent node, a PMA of a mobile node establishes a routing optimization proxy binding between the PMA of the mobile node and a PMA of the correspondent node, or between the PMA of the mobile node and the correspondent node.

Step S2: According to the established routing optimization proxy binding, the PMA of the mobile node controls routing of a message to be transmitted.

It should be noted that the optimization procedure for the routing between the mobile node and the correspondent node is triggered by the PMA of the mobile node. And there are three preconditions for the implement of the routing optimization:

1. establishing a safe channel between the PMA of the mobile node and the home agent of the correspondent node and establishing a safe channel between the PMA of the correspondent node and the home agent of the mobile node, where the procedure for establishing safe channels is provided in the conventional art which will be omitted herein;

2. collecting an address list from the correspondent node by the corresponding PMA of the mobile node. The list includes a home address of the correspondent node, a network access identifier (NAI) of the mobile node and a home address corresponding to the mobile node, where the collection for the address list already exists in the conventional art which will be omitted herein likewise;

3. establishing, by a node supporting the PMIP6 protocol, a data structure on an Authentication\Authorization\Accounting (AAA) server which may use the home address and a domain name of the mobile node as an index for querying for the mobile node information. The AAA server in the conventional art may generally satisfy the condition.

In addition, the correspondent node in the embodiment may be mobile nodes which support the PMIP protocol, or nodes of other types. The nodes of other types are further categorized into server types as follows:

1. nodes which support an Mobile IP (MIP) protocol, where the routing optimization may be performed on the nodes of such type according to the embodiments of the present invention;

2. nodes which do not support the MIP protocol, where the routing optimization will not be performed on the nodes of such type according to the embodiments of the present invention;

3. nodes where the correspondent node information can not be obtained with a joint index of the domain name and the address of the correspondent node, and where similarly the routing optimization will not be performed on the nodes of such type according to the embodiments of the present invention.

In the embodiments of the present invention, the type of the node may be determined by querying for the AAA server. In specific implementation, the PMA of the mobile node queries for the AAA server, according to the home address of the correspondent node, whether the home agent address of the correspondent node is stored therein. If the home agent address of the correspondent node is stored in the AAA server, the correspondent node is the node which supports the PMIP6. Otherwise, the correspondent node is the node of other types. In specific implementation, the PMA of the mobile node may use the home address and the domain name of the mobile node as an index for querying for the AAA server, or may use other indexes for query according to the data structure of the AAA server.

Accordingly, the routing optimization proxy binding in the embodiments of the present invention may vary with different types of the correspondent nodes. If the correspondent node is a mobile node, the routing optimization proxy binding will be a binding between the home address of the correspondent node and the PMA address of the correspondent node. If the correspondent node is a node of other types, e.g. a node supporting the MIP protocol, the routing optimization proxy binding will be a binding for the home address of the correspondent node itself. A specific proxy binding list is shown in Table 1:

TABLE 1

| Dst | Alt Dst |
|---|---| where the Destination (Dst) field is a destination address configured to represent the home address (HoA) of the correspondent node; the Alternation Destination (Alt Dst) field is a forward address configured to represent an address binding to the home address of the correspondent node. If the correspondent node is a mobile node supporting the PMIP6 protocol, the Dst field will be the home address (HoA) of the correspondent node, and the Alt Dst field will be the corresponding PMA address of the correspondent node. If the correspondent node is a node supporting the MIP protocol, both the Dst filed and the Alt Dst field will be the HoA of the correspondent node.

Additionally, a field indicative of a type of the correspondent node, which is marked as M, may be further included in the routing optimization binding list, as shown in Table 2:

TABLE 2

| M | Dst | Alt Dst |
|---|---|---|

When the M is 1, it indicates that the correspondent node is a mobile node supporting the PMIPV6 protocol; when the M is 0, it indicates that the correspondent node is a node of other types.

Further description will be made to the first embodiment of the present invention according to different types of the correspondent node as follows. A user terminal on one side is called a mobile node (MN). Accordingly, there lies a PMA1 of the mobile node and a HA1 of the mobile node. A node on the other side, no matter a mobile node or a node of other types, is called a correspondent node (CN). Accordingly, there lies a PMA2 of the correspondent node and a HA2 of the correspondent node. Therefore, the two interacting sides are distinguished as such.

In the case that the correspondent node is a mobile node supporting the PMIPV6 protocol, the step S1 aforementioned is usually divided into three sub-procedures in practice, where a first sub-procedure is a procedure for discovering the PMA2 of the correspondent node; a second sub-procedure is an optional procedure (might not be included) for generating a shared key from the interaction between the PMA1 of the mobile node and the PMA2 of the correspondent node. For a safe transmission through the network, this optional procedure is included in the description of the specific implementing procedures according to the first embodiment of the present invention; a third sub-procedure is a procedure for establishing a routing optimization proxy binding list from the interaction between the PMA1 of the mobile node and the PMA2 of the correspondent node. The description will be made to the above three procedures respectively as follows.

Figure 3:
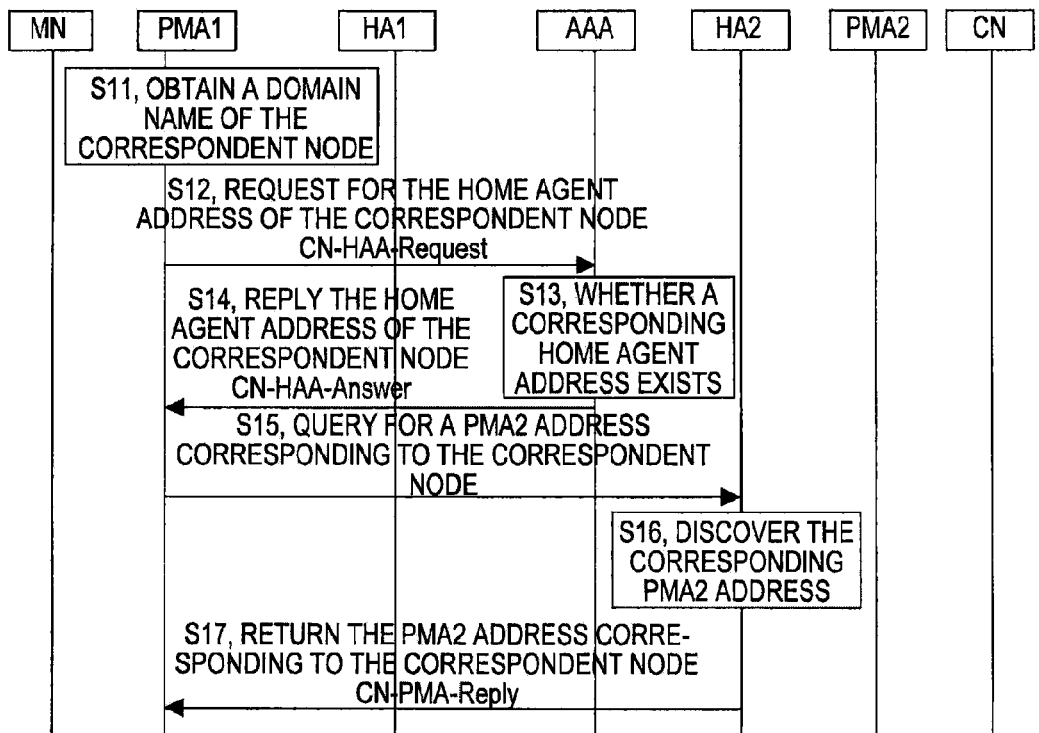
FIG. 3 is a flowchart diagram of discovering a correspondent PMA address according to a second embodiment of the present invention.

Referring to FIG. 3, a flowchart diagram of discovering a correspondent PMA address according to a second embodiment of the present invention is illustrated. The procedure mainly includes following steps.

Step S11: The PMA1 of the mobile node queries for a domain name server (DNS) based on the home address of the correspondent node, and then obtains a domain name of the correspondent node from the DNS.

Step S21: The PMA1 sends to the AAA server a CN-HAA-Request message taking the home address and the domain name of the correspondent node as an index, and requests for the home agent address of the correspondent node.

Step S13: The AAA server queries whether a home agent address corresponding to the home address and the domain name of the correspondent node exists. If the home agent address corresponding to the home address and the domain name of the correspondent node exists, step S14 will be performed.

Step S14: The AAA server replies a CN-HAA-Answer message to the PMA1, and returns an HA2 address of the correspondent node.

Step S15: The PMA1 sends to the HA2 a CN-PMA-Request message based on the home agent address of the correspondent node, querying for a PMA2 address corresponding to the correspondent node.

Step S16: The HA2 queries for the binding list based on the home agent address of the correspondent node in order to discover the corresponding PMA2 address.

Step S17: The HA2 sends a CN-PMA-Reply message to the PMA1 to return the PMA2 address corresponding to the correspondent node.

It should be noted that in the aforementioned step S15, after the PMA1 obtains the PMA2 address of the correspondent node based on the home agent address of the correspondent node, a marker M=1 indicative of the type of the correspondent node is established according to the received HA2 address.

Figure 4:
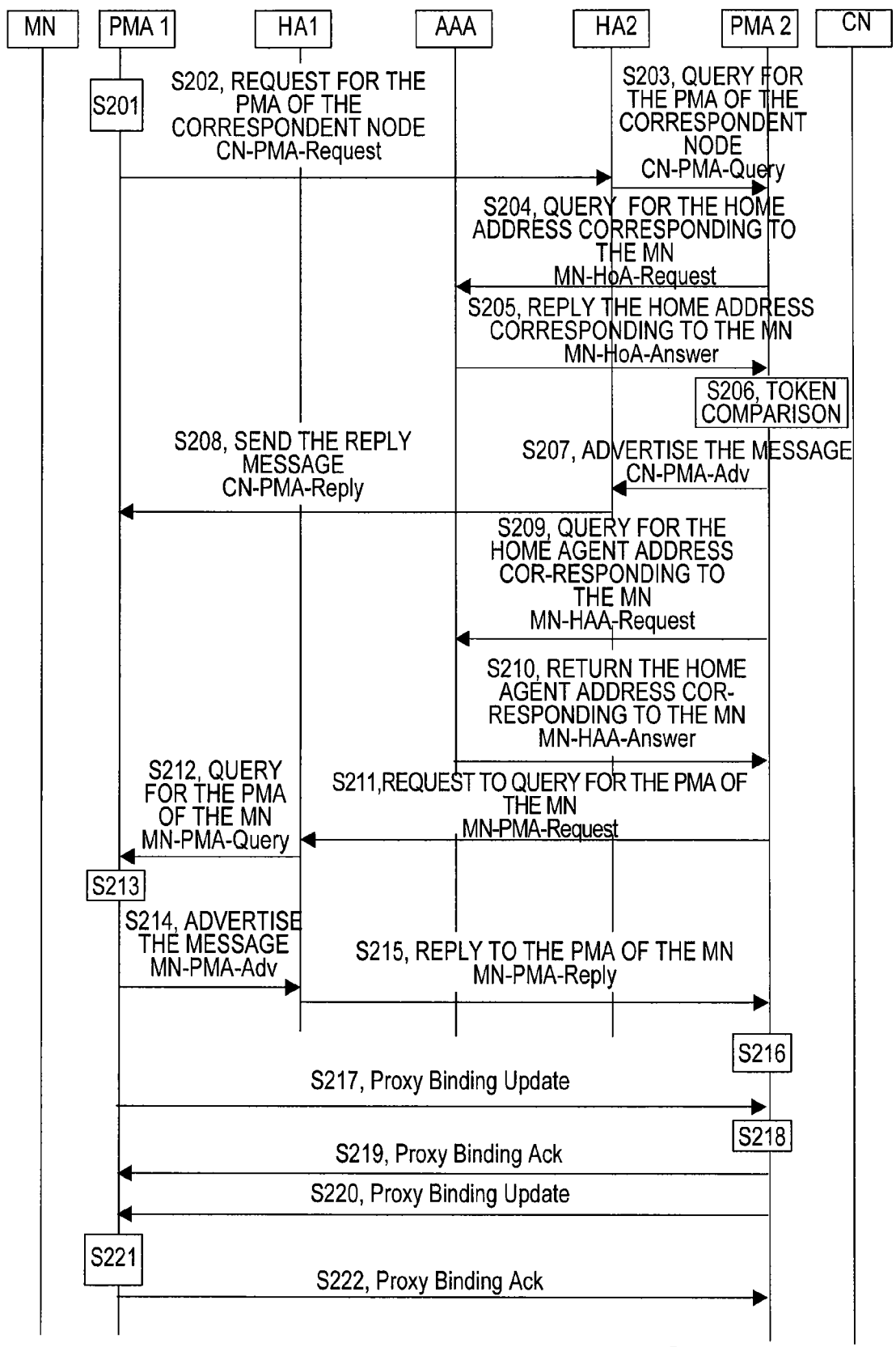
FIG. 4 is a flowchart diagram of generating a shared proxy binding management key according to a third embodiment of the present invention.

FIG. 4 illustrates a flowchart diagram of generating a shared proxy binding management key from the interaction between the PMA 1 of the mobile node and the PMA2 of the correspondent node according to a third embodiment of the present invention. The procedure mainly includes following steps.

Step S201: The PMA1 obtains the home address of the mobile node from the correspondent node address list and generates a Token1:

Token1=First(128, SHA1(HoA of MN|PMA1 Address)).

Step S202: The PMA2 sends to the HA2 of the correspondent node a CN-PMA-Request carrying the NAI option of the mobile node and the Token1 option, requesting for the PMA2 address corresponding to the correspondent node.

Step S203: The HA2 corresponding to the correspondent node sends to the PMA2 corresponding to the correspondent node a CN-PMA-Query message carrying the NAI option, the Token1 option and the PMA1 address option, requesting for the PMA2 address.

Step S204: The PMA2 sends to the AAA server an MN-HoA-Request message based on the NAI option of the MN to query for the HoA1 address corresponding to the MN.

Step S205: After the HA1 address corresponding to the MN is obtained by the AAA server, the AAA server sends an MN-HoA-Answer message to the PMA2 to reply the corresponding HoA1 address.

Step S206: A Token1 is calculated based on the replied HoAI address and the PMA1 address of the mobile node, and is compared with the Token1 in the CN-PMA-Query message in the step S203. It indicates a failure in an authentication if the Token1' is not identical with the Token1. Otherwise, it indicates a success in the authentication if the Token1 is identical with the Token1, and a Token2 will be generated:

Token2=First(128,SHA1(HoA of CN|PMA2 Address)).

Step S207: The PMA2 sends to the HA2 a CN-PMA-Adv message to return the PMA2 address.

Step S208: The HA2 sends to the PMA1 a CN-PMA-Reply message to return the PMA2 address to the PMA 1.

Step S209: The PMA2 sends to the AAA server an MN-HAA-Request message based on the NAI option of the MN to query for the HA1 address corresponding to the MN.

Step S210: After the HA1 address corresponding to the MN is obtained by the AAA server, the AAA server sends an MN-HAA-Answer message to the PMA2 to return the HA1 address corresponding to the PMA2.

Step S211: The PMA2 sends to the HA1 an MN-PMA-Request message which also carries the Token2 option to request for the PMA1 address.

Step S212: The HA1 queries for a local binding list based on the home address of the mobile node, and queries for the corresponding PMA1 address, and sends to the PMA1 an MN-PMA-Query message carrying the Token2 option.

Step S213: The PMA1 performs authentication on the Token2 of the correspondent node, and generates a Token2' based on the home address of the correspondent node and the corresponding PMA2 address. The Token2' is compared with the Token2. It indicates a success in the authentication if the Token2' is identical with the Token2, and then a proxy binding management (PKbm) key is generated by the PMA1 and the PKbm=SHA1(Token1|Token2).

Step S214: The PMA1 replies to the HA1 corresponding to the correspondent node an MN-PMA-Adv message.

Step S215: The HA1 replies to the PMA2 an MN-PMA-Reply message where the PMA1 address corresponding to the mobile node is carried.

Step S216: The PMA1 receives the MN-PMA-Reply message from the HA1 and extracts the PMA1 address corresponding to the mobile node which is then compared with the PMA1 address in the CN-PMA-Adv message. If the PMA1 address corresponding to the mobile node is identical with the PMA1 address in the CN-PMA-Adv message, the PMA2 generates a same proxy binding management key (PKbm), thereby establishing a shared PKbm key for the PMA1 and the PMA2.

The process for establishing the shared proxy binding is merely one preferable embodiment of the present invention. In actual practice, other methods might also be adopted to achieve benefits of the embodiments of the present invention.

The description below will be made to the procedures for establishing the proxy binding from the interaction between the PMA1 of the mobile node and the PMA2 of the correspondent node, referring to FIG. 4 again.

Step S217: The PMA1 of the mobile node sends to the PMA2 of the correspondent node a Proxy Binding Update message which is encrypted using the PKbm.

Step S218: The PMA2 decrypts the Proxy Binding Update message, and establishes a mapping relationship between the home address of the mobile node and the PMA1 of the mobile node.

Step S219: The PMA2 replies a Proxy Binding Ack acknowledgment to the PMA1.

Step S220: The PMA2 of the correspondent node sends to the PMA1 of the mobile node a Proxy Binding Update message which is encrypted using the PKbm.

Step S221: The PMA1 decrypts the Proxy Binding Update message, and establishes a mapping relationship between the home address of the correspondent node and the PMA2 of the correspondent node.

Step S222: The PMA1 replies a Proxy Binding Ack acknowledgment to the PMA2 in order to establish a bi-directional tunnel between the PMA1 and the PMA2.

It should be noted that if no shared PKbm is established, that is, steps S217 to S222 will directly proceed after the step S17, and the encryption and decryption procedures therein will not exist accordingly.

Moreover, a four-way handshake process from the step S217 to the step S222 in the present embodiment may also be implemented in a three-way handshake process, i.e. the step S219 is omitted, which may save the signaling overhead. Consequently, the three-way handshake process is optional.

Figure 5:
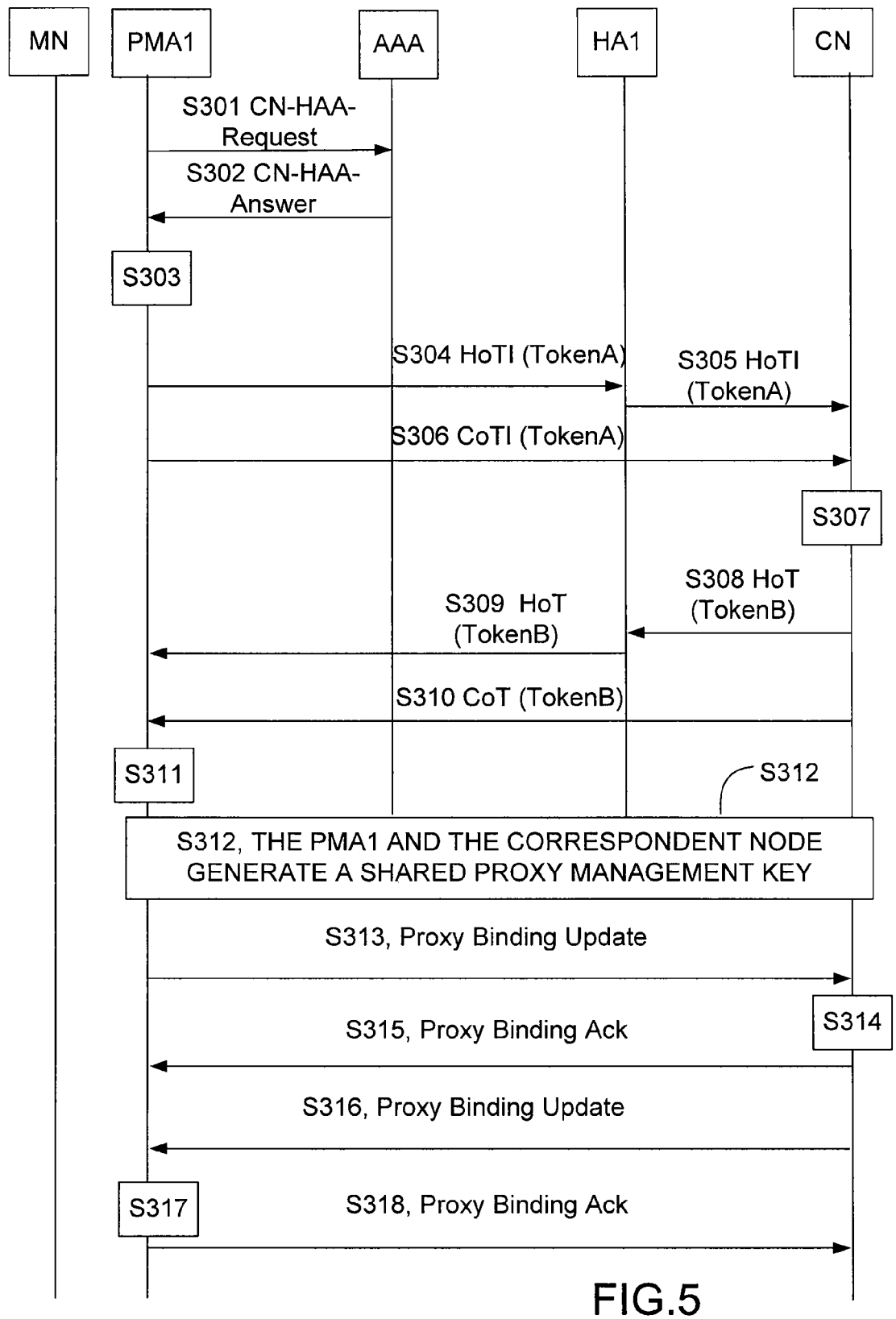
FIG. 5 is a flowchart diagram of establishing a routing optimization proxy binding according to a fourth embodiment of the present invention.

Taking the correspondent node which is the node of other types as an example, the description below will be made to a specific implementation of the aforementioned step S1. Referring to FIG. 5, a flowchart diagram of establishing a routing optimization proxy binding according to a fourth embodiment of the present invention is illustrated. The procedure specifically includes following steps.

Step S301: The PMA1 of the mobile node queries for the DNS server based on the home address of the correspondent node to query for the corresponding domain name list, and sends to the AAA server a CN-HAA-Request message with the home address and the domain name of the correspondent node being the index respectively, requesting for the HA1 address corresponding to the correspondent node.

Step S302: The AAA server determines whether a correspondent node entry corresponding to the home address and the domain name of the correspondent node is stored. If the correspondent node entry corresponding to the home address and the domain name of the correspondent node is not stored, a CN-HAA-Answer will be replied to the PMA1 and the home agent address corresponding to the correspondent node will be returned, indicating that the correspondent node is the node of other types.

Step S303: The PMA1 receives a CN-HAA-Answer message from the AAA server and confirms that the correspondent node is the node of other types, and then generates a Token A:

Token A=First(128,SHA1(Nonce1 XOR PMA1 Address)).

Step S304: The PMA1 sends to the HA1 of the correspondent node a home test initial (HoTI) message carrying the Token A.

Step S305: The HA1 forwards the HoTI message to the correspondent node.

Step S306; The PMA1 sends to the correspondent node a care-of test initial (CoTI) message carrying the Token A.

Step S307: The correspondent node receives the HOTI message and the CoTI message respectively. If the Token A carried in the HOTI message is identical with the Token A carried in the CoTI message, the correspondent node generates a Token B as follow:

Token B=First(128,SHA1(Nonce2 XOR CN Care-of Address)).

Step S308: The correspondent node sends to the HA1 a home test (HoT) message carrying the Token B.

Step S309: The HA1 forwards the HoT message to the PMA1.

Step S310: The correspondent node sends to the PMA1 a care-of test (CoT) message carrying the Token B.

Step S311: The PMA 1 receives the HoT message and the CoT message from the correspondent node respectively, and determines whether the Token B carried in the HoT message is identical with the Token B carried in the CoT message. If the Token B carried in the HoT message is identical with the Token B carried in the CoT message, step S312 will be performed. Otherwise, no routing optimization will be processed to quit directly.

Step S312: The PMA1 and the correspondent node generate a proxy binding management (PKbm) key as follow:

PKbm=SHA1 (Home KeyGenToken|Careof KeyGenToke|TokenA|TokenB).

Step S313: The PMA1 sends to the correspondent node a proxy binding update (PBU) message which is encrypted with the PKbm key.

Step S314: After the PBU message is decrypted, the correspondent node creates a mobile node binding list, thereby establishing a mapping relationship between the home address of the mobile node and the corresponding PMA1 address.

Step S315: The correspondent node sends to the PMA1 a Proxy Binding Ack acknowledgment.

Step S316: The correspondent node sends to the PMA1 a proxy binding update (PBU) message which is encrypted by the PKbm key.

Step S317: After the PBU message is decrypted, the PMA1 creates a correspondent node binding list, thereby establishing a mapping relationship between the address of the correspondent node and the address of the correspondent node.

Step S318: The PMA1 sends to the correspondent node a Proxy Binding Ack acknowledgment.

It should be noted that in the aforementioned step S302, the AAA server may further return to the PMA1 a marker M=0 indicative of the type of the correspondent node. Accordingly, in the step S303, after the PMA1 receives the CN-HAA-Answer message from the AAA server and confirms that the correspondent node is the node of other types, a marker M=0 indicative of the type of the correspondent node may be further established.

Moreover, a four-way handshake process from the step S309 to the step S314 in the present embodiment may also be implemented in a three-way handshake process, i.e. the step S311 is omitted, which may save the signaling overhead. The three-way handshake process is optional.

Figure 6:
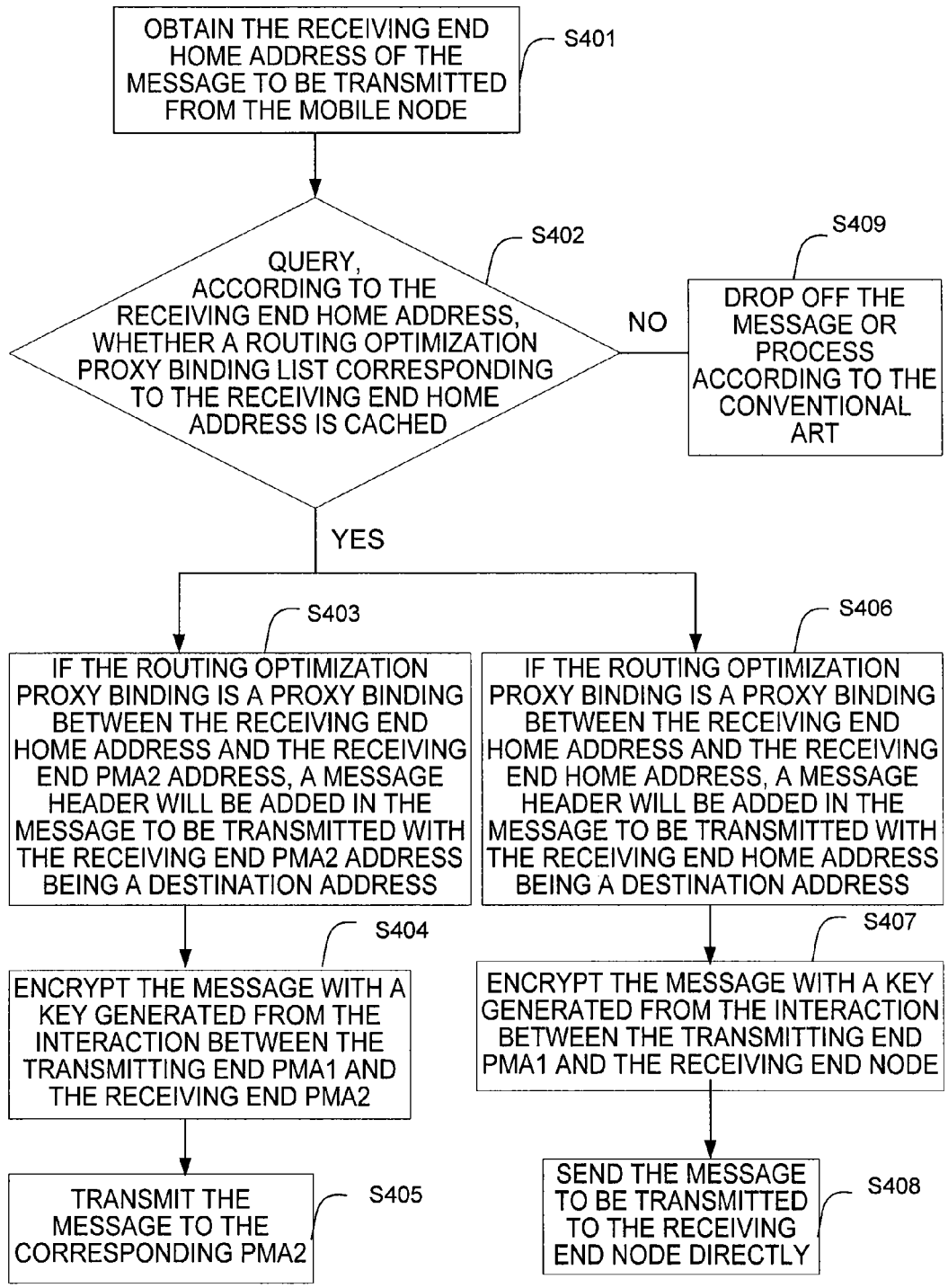
FIG. 6 is a flowchart diagram of processing a message from a mobile node according to a fifth embodiment of the present invention.

The description below will be made to the specific implementation for the step S2 in the first embodiment, i.e. the control of routing of a message to be transmitted according to the established routing optimization proxy binding. Referring to FIG. 6, a flowchart diagram of processing the message from the mobile node by the PMA1 of the mobile node according to a fifth embodiment of the present invention is illustrated. The procedure mainly includes following steps.

Step S401: The receiving end home address of the message to be transmitted from the mobile node is obtained.

Step S402: It is queried, according to the receiving end home address, whether a routing optimization proxy binding list corresponding to the receiving end home address is cached. If the routing optimization proxy binding list corresponding to the receiving end home address is cached, step S403 or step S406 will be performed. Otherwise, step S409 will be performed.

Step S403: If the routing optimization proxy binding is a proxy binding between the receiving end home address and the receiving end PMA2 address, a message header will be added, with the receiving end PMA2 address being a destination address, in the message to be transmitted.

Step S404: The message is encrypted with a key generated from the interaction between the transmitting end PMA1 and the receiving end PMA2.

Step S405: The message is transmitted to the corresponding PMA2 and then the procedure is done.

Step S406: If the routing optimization proxy binding is a proxy binding between the receiving end home address and the receiving end home address, a message header will be added in the message to be transmitted with the receiving end home address being a destination address.

Step S407: The message is encrypted with a key generated from the interaction between the transmitting end PMA1 and the receiving end node.

Step S408: The message to be transmitted is directly sent to the receiving end node, and then the procedure is done.

Step S409: The message is dropped off, or it is processed according to the conventional art.

It should be noted that a step for determining the type of the receiving end node may be further added in the present embodiment. That is the type of the receiving end node is determined between the step S402 and the step S403. If the marker indicative of the type of the receiving end node is marked as 1, indicating that the receiving end node is a mobile node, the step S403 will be performed. Otherwise, if the marker indicative of the type of the receiving end node is marked as 0, indicating that the receiving end node is a node of other types, the step S406 will be performed.

The description below will be made to the detailed embodiments of the present invention.

Figure 7:
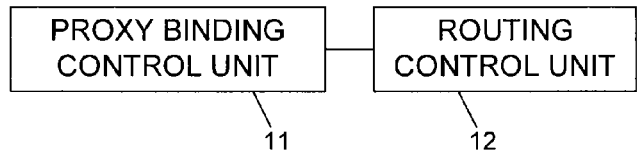
FIG. 7 is a main structure diagram of a PMA moving along a network side according to a sixth embodiment of the present invention.

Referring to FIG. 7, a main structure diagram of a PMA moving along a network side according to a sixth embodiment of the present invention is illustrated. The PMA mainly includes: a proxy binding control unit 11, configured to establish, based on the interaction with the home agent of the correspondent node, a routing optimization proxy binding relationship between the PMA of the mobile node and the PMA of the correspondent node, or a routing optimization proxy binding relationship between the PMA of the mobile node and the correspondent node address; and a routing control unit 12, configured to control the routing of the message to be transmitted based on the routing optimization proxy binding relationship.

Figure 8:
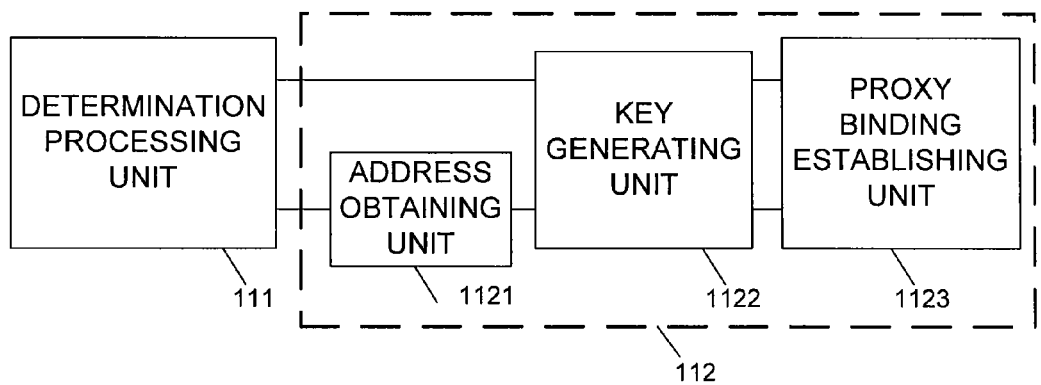
FIG. 8 is a diagram of a proxy binding control unit according to a seventh embodiment of the present invention.

Referring to FIG. 8, a specific structure of the proxy binding control unit 11 according to a seventh embodiment of the present invention is illustrated. The proxy binding control unit 11 mainly includes a determination processing unit 111 and a control unit 112. The control unit 112 specifically includes: an address obtaining unit 1121, a key generating unit 1122 and a proxy binding establishing unit 1123.

The determination processing unit 111 queries for the DNS based on the home address of the correspondent node and obtains the domain name of the correspondent node, and then determines based on the home address of the correspondent node and the obtained domain name that whether a home agent address corresponding to the home address and the domain name of the correspondent node exists in a network server. If the home agent address corresponding to the home address and the domain name of the correspondent node exists in a network server, the home agent address of the correspondent node is firstly obtained from the interaction between the address obtaining unit 1121 and the network server, and the corresponding PMA address of the correspondent node is then obtained from the interaction between the address obtaining unit 1121 and the home agent of the correspondent node designated by the home agent address of the correspondent node. Next, the shared proxy binding management (PKbm) key is generated from the interaction between the key generating unit 1122 and the PMA of the correspondent node. Finally, the routing optimization proxy binding is established from the interaction between the proxy binding establishing unit 1123 and the PMA of the correspondent node. Otherwise, after the proxy binding key of the correspondent node is generated by the key generating unit 1122, the routing optimization proxy binding is established from the interaction between the proxy binding establishing unit 1123 and the correspondent node.

Furthermore, the network server in the embodiment may be an AAA server or any server storing mobile nodes or information of correspondent nodes.

Figure 9:
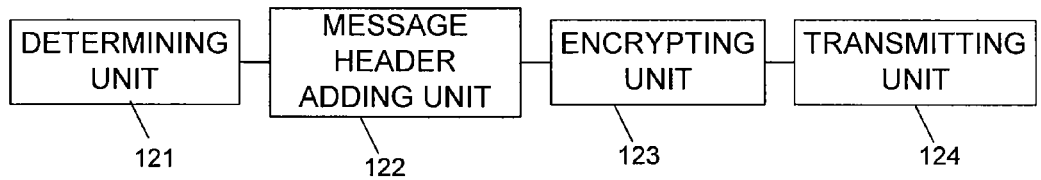
FIG. 9 is a diagram of a routing control unit according to an eighth embodiment of the present invention.

Referring to FIG. 9, a specific structure of the routing control unit 12 according to an eighth embodiment of the present invention is illustrated. The routing control unit 12 mainly includes: a determining unit 121, a message header adding unit 122, an encrypting unit 123 and a transmitting unit 124.

Firstly, the determining unit 121 determines whether a routing optimization proxy binding corresponding to the receiving end home address of the message is cached. If it is cached, the message header adding unit 122 adds a message header in the message according to the routing optimization proxy binding. If the routing optimization proxy binding is a binding between the receiving end home address and the receiving end PMA address, an outer message header will be added in the message with the receiving end PMA address being a destination address. If the routing optimization proxy binding is a binding between the receiving end home address and the receiving end home address, an outer message header will be added in the message with the receiving end home address being a destination address. Next, the encrypting unit 123 encrypts the message with the shared proxy binding management key. Finally, the transmitting unit 124 sends the message added with the outer message header. Otherwise, the message is transmitted by the transmitting unit 124 through a tunnel to the receiving end home address.

Figure 10:
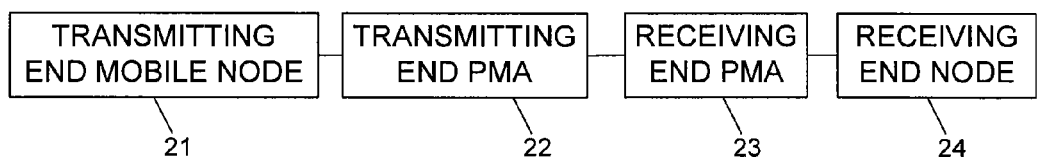
FIG. 10 is a structure diagram of a message transmission system according to a ninth embodiment of the present invention.

Referring to FIG. 10, a structure diagram of a message transmission system according to a ninth embodiment of the present invention is illustrated. The message transmission system mainly includes: a transmitting end mobile node 21, a transmitting end PMA 22, a receiving end PMA 23 and a receiving end node 24.

A message is firstly sent from the transmitting end mobile node 21 and is then obtained by the transmitting end PMA 22 corresponding to the transmitting end mobile node 21. According to the cached routing optimization proxy binding between the receiving end home address and the receiving end PMA address of the message, the message is transmitted after an outer message header is added in the message with the receiving end PMA address being a destination address. Next, the receiving end PMA 23 receives the message from the transmitting end PMA 22 and sends the message after the message header is stripped from the message. Finally, the message from the receiving end PMA 23 is received by the receiving end node 24.

In the present embodiment, the message may be directly transmitted from the transmitting end PMA 22 to the receiving end PMA 23 in a manner of bypassing the home agent. Therefore, the communication efficiency between the nodes at two ends is improved.

Figure 11:
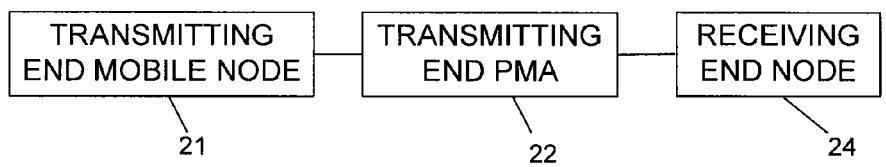
FIG. 11 is a structure diagram of a message transmission system according to a tenth embodiment of the present invention.

Referring to FIG. 11, a structure diagram of a message transmission system according to a tenth embodiment of the present invention is illustrated. The message transmission system mainly includes: a transmitting end mobile node 21, a transmitting end PMA 22 and a receiving end node 24.

In the specific implementation, the message is firstly transmitted by the transmitting end mobile node 21 and is then obtained by the transmitting end PMA 22 corresponding to the transmitting end mobile node 21. According to the cached routing optimization proxy binding between the receiving end home address and the receiving end home address for the message, the message is transmitted after an outer message header is added in the message with the receiving end PMA address being a destination address. Finally, the message is received by the receiving end node 24.

In the present embodiment, the message may be directly transmitted from the transmitting end PMA 22 to the receiving end node 24 in a manner of bypassing the home agent. Therefore, the communication efficiency between the nodes at two ends is improved.

The foregoing teachings are merely a number of exemplary embodiments of the present invention. It shall be noted that several improvements and modifications can be made by the ordinary people skilled in the art without departing from the principle of the present invention. These improvements and modifications shall be construed as being within the scope of protection of the present invention.

What is claimed is:

1. A routing optimization method, comprising:
   querying for a domain name of a correspondent node according to a home address of the correspondent node;
   confirming, according to the home address of the correspondent node and the domain name, that a home agent address corresponding to the home address and the domain name of the correspondent node exists;
   obtaining the home agent address of the correspondent node;
   obtaining a proxy mobile agent (PMA) address of the correspondent node from interaction with the home agent of the correspondent node;
   establishing a routing optimization proxy binding relationship between a PMA of a mobile node and the PMA of the correspondent node or between the PMA of the mobile node and the correspondent node; and
   controlling, by the PMA of the mobile node, according to the established routing optimization proxy binding relationship, routing of a message to be transmitted;
   wherein before establishing the routing optimization proxy binding relationship between the PMA of the mobile node and the correspondent node, the method further comprises:
   generating, by the PMA of the mobile node, a first token; and transmitting to the correspondent node a home test initial message and a care-of test initial message carrying the first token respectively;
   detecting, by the correspondent node, whether the first token carried in the home test initial message is identical with the first token carried in the care-of test initial message; and generating a second token if the first token carried in the home test initial message is determined to be identical with the first token carried in the care-of test initial message; and transmitting to the PMA of the mobile node, the home test message and the care-of test message carrying the second token respectively; and
   receiving, by the PMA of the mobile node, the home test message and the care-of test message from the correspondent node, and determining whether the second token carried in the home test message is identical with the second token carried in the care-of test message; and confirming that the home address of the correspondent node is routable if the second token carried in the home test message is determined to be identical with the second token carried in the care-of test message; generating, by both the PMA of the mobile node and the correspondent node, a proxy binding management key.

2. A proxy mobile agent (PMA) of a mobile node, comprising:
   a proxy binding control unit, configured to:
   query for a domain name server (DNS) based on a home address of a correspondent node and obtain a domain name of the correspondent node from the DNS;
   query for an Authentication\Authorization\Accounting (AAA) server by using the home address of the correspondent node and the domain name of the correspondent node as an index in order to determine whether a home agent address corresponding to the home address and the domain name of the correspondent node exists;

obtain the home agent address from the AAA server if it is confirmed that the home agent address corresponding to the home address and the domain name of the correspondent node exists; and establish a routing optimization proxy binding relationship from interaction with a PMA of the correspondent node after a PMA address of the correspondent node is obtained from interaction with a home agent, which is associated with the home agent address, of the correspondent node; and a routing control unit, configured to control routing of a message to be transmitted, based on the established routing optimization proxy binding relationship;

wherein the PMA of the mobile node further comprises:

a transmitting unit configured to generate a first token and transmit to the PMA of the correspondent node a home test initial message and a care-of test initial message carrying the first token respectively, so as to make the PMA of the correspondent node detect whether the first token carried in the home test initial message is identical with the first token carried in the care-of test initial message; and generate a second token if the first token carried in the home test initial message is determined to be identical with the first token carried in the care-of test initial message; and transmit to the PMA of the mobile node, a home test message and a care-of test message carrying the second token respectively;

a receiving unit configured to receive the home test message and the care-of test message from the PMA of the correspondent node, and determine whether the second token carried in the home test message is identical with the second token carried in the care-of test message;

a confirming unit, configured to confirm that the home address of the correspondent node is routable if the second token carried in the home test message is determined to be identical with the second token carried in the care-of test message; and a generating unit, configured to generate a proxy binding management key.

3. The PMA of claim 2, wherein the proxy binding control unit comprises:

an address obtaining unit, configured to obtain the home agent address of the correspondent node, and to obtain the corresponding PMA address of the correspondent node from the interaction with the home agent corresponding to the home address of the correspondent node; and a proxy binding establishing unit, configured to establish the routing optimization proxy binding relationship from the interaction with the PMA of the correspondent node after the PMA address of the correspondent node is obtained by the address obtaining unit.

4. The PMA of claim 2, wherein the control unit further comprises:

a key generating unit, configured to establish a shared proxy binding management key by interacting with the PMA of the correspondent node after the PMA address of the correspondent node is obtained by the address obtaining unit and before the binding is established by the proxy binding establishing unit.

5. The PMA of claim 4, wherein the proxy binding control unit further comprises:

an address obtaining sub-unit, configured to obtain the home address of the correspondent node in the message transmitted from the mobile node to the correspondent node; and to obtain the PMA address of the correspondent node based on the home address of the correspondent node and the routing optimization proxy binding relationship;

a message header adding unit, configured to add an outer message header in the message with the PMA address of the correspondent node being a destination address; and a transmitting unit, configured to transmit the message added with the outer message header.

6. The PMA of claim 5, wherein the proxy binding control unit further comprises:

an encrypting unit, configured to encrypt the message with the key generated by the key generating unit after the outer message header is added in the message by the message header adding unit and before the message added with the outer message header is transmitted by the transmitting unit.

7. A routing optimization method, comprising: querying, by a proxy mobile agent (PMA) of a mobile node, for a domain name server (DNS) based on a home address of a correspondent node and obtaining a domain name of the correspondent node from the DNS;

querying, by the PMA of the mobile node, for an Authentication\Authorization\Accounting (AAA) server by using the home address of the correspondent node and the domain name of the correspondent node as an index in order to determine whether a home agent address corresponding to the home address and the domain name of the correspondent node exists;

obtaining, by the PMA of the mobile node, the home agent address from the AAA server if it is confirmed that the home agent address corresponding to the home address and the domain name of the correspondent node exists;

establishing, by the PMA of the mobile node, a routing optimization proxy binding relationship from interaction with a PMA of the correspondent node after a PMA address of the correspondent node is obtained from interaction with a home agent which is associated with the home agent address, of the correspondent node; and controlling, by the PMA of the mobile node, routing of a message to be transmitted, based on the established routing optimization proxy binding relationship;

wherein before establishing the routing optimization proxy binding relationship, the method further comprises:

generating, by the PMA of the mobile node, a first token; and transmitting to the PMA of the correspondent node a home test initial message and a care-of test initial message carrying the first token respectively, so as to make the PMA of the correspondent node detect whether the first token carried in the home test initial message is identical with the first token carried in the care-of test initial message; and generate a second token if the first token carried In the home test initial message is determined to be identical with the first token carried in the care-of test initial message; and transmit to the PMA of the mobile node, a home test message and a care-of test message carrying the second token respectively; and receiving by the PMA of the mobile node, the home test message and the care-of test message from the PMA of the correspondent node, and determining whether the second token carried in the home test message is identical with the second token carried in the care-of test message; and confirming that the home address of the correspondent node is routable if the second token carried in the home test message is determined to be identical with the second token carried in the care-of test message; generating by the PMA of the mobile node, a proxy binding management key with the correspondent node.

8. A routing optimization method, comprising:
querying, by a proxy mobile agent (PMA) of a mobile node, for a domain name server (DNS) based on a home address of a correspondent node and obtaining a domain name of the correspondent node from the DNS;
querying, by the PMA of the mobile node, for an Authentication\Authorization\Accounting (AAA) server by using the home address of the correspondent node and the domain name of the correspondent node as an index in order to determine whether a home agent address corresponding to the home address and the domain name of the correspondent node exists;
establishing, by the PMA of the mobile node, a routing optimization proxy binding relationship from interaction with the correspondent node if it is confirmed that the home agent address corresponding to the home address and the domain name of the correspondent node does not exist; and
controlling, by the PMA of the mobile node, routing of a message to be transmitted, based on the established routing optimization proxy binding relationship;
wherein before establishing the routing optimization proxy binding relationship, the method further comprises:
generating, by the PMA of the mobile node, a first token; and transmitting to the correspondent node a home test initial message and a care-of test initial message carrying the first token respectively, so as to make the correspondent node detect whether the first token carried in the home test initial message is identical with the first token carried in the care-of test initial message; and generate a second token if the first token carried In the home test initial message is determined to be identical with the first token carried in the care-of test initial message; and transmit to the PMA of the mobile node, a home test message and a care-of test message carrying the second token respectively; and
receiving by the PMA of the mobile node, the home test message and the care-of test message from the correspondent node, and determining whether the second token carried in the home test message is identical with the second token carried in the care-of test message; and confirming that the home address of the correspondent node is routable if the second token carried in the home test message is determined to be identical with the second token carried in the care-of test message; and generating by the PMA of the mobile node, a proxy binding management key with the correspondent node.

\* \* \* \* \*